United States Patent [19]

Fink et al.

[11] Patent Number: 5,093,539
[45] Date of Patent: Mar. 3, 1992

[54] PROCESS FOR PREPARING ALPHA-OLEFIN POLYMERS AND OLIGOMERS

[75] Inventors: Gerhard Fink; Volker Möhring, both of Mülheim/Ruhr, Fed. Rep. of Germany

[73] Assignee: Studiengesellschaft Kohle MBH, Mülheim, Fed. Rep. of Germany

[21] Appl. No.: 277,100

[22] Filed: Nov. 29, 1988

Related U.S. Application Data

[60] Continuation of Ser. No. 55,204, May 28, 1987, abandoned, which is a division of Ser. No. 827,833, Feb. 7, 1986, Pat. No. 4,724,273.

[30] Foreign Application Priority Data

Feb. 13, 1985 [DE] Fed. Rep. of Germany ....... 3504809

[51] Int. Cl.⁵ .............. C10M 107/08; C10M 107/10; C08F 10/00
[52] U.S. Cl. ......................... 585/10; 585/12; 526/348.2; 526/348.3; 526/348.4; 526/348.5; 526/348.6
[58] Field of Search ................. 585/10, 12; 526/348.2, 526/348.3, 348.4, 348.5, 348.6

[56] References Cited

U.S. PATENT DOCUMENTS

| | | | |
|---|---|---|---|
| 2,895,915 | 7/1959 | Hewitt et al. | 526/248.3 |
| 3,112,300 | 11/1963 | Natta et al. | 526/348.5 |
| 3,435,017 | 3/1969 | Natta et al. | 526/351 |
| 3,631,002 | 12/1971 | Bronnstein | 526/351 |
| 3,644,564 | 2/1972 | Van Zwet et al. | 526/171 |
| 3,686,159 | 8/1972 | Bauer et al. | 585/511 |
| 3,950,449 | 4/1976 | Girolti et al. | 585/18 |
| 4,017,553 | 4/1977 | Cesca et al. | 585/18 |
| 4,121,030 | 10/1978 | Candlin et al. | 526/351 |
| 4,122,023 | 10/1978 | Tasui et al. | 585/18 |
| 4,310,716 | 1/1982 | Beach et al. | 585/527 |
| 4,537,982 | 8/1985 | Starzewski et al. | 526/171 |

*Primary Examiner*—Edward J. Smith
*Attorney, Agent, or Firm*—Sprung Horn Kramer & Woods

[57] ABSTRACT

The invention relates to polymers and oligomers characterized in that they have been prepared from α-olefin monomers or mixtures thereof and the distances between the methyl branching paints are controllable by the selection of the α-olefins and to a process for preparing said novel polymers and oligomers.

6 Claims, 7 Drawing Sheets

PROCESS FOR PREPARING ALPHA-OLEFIN POLYMERS AND OLIGOMERS

This is a continuation of application Ser. No. 055,204, filed May 28, 1987, now abandoned, which is a divisional of application Ser. No. 827,833, filed Feb. 7, 1986, now U.S. Pat. No. 4,724,273.

The present invention relates to a process for preparing polymers and oligomers of α-olefins having sites of methyl branching at defined distances which are adjustable due to the selection of the α-olefin.

The polymerization and oligomerization of α-olefins which is known to be achievable by use of a variety of catalysts leads to the formation of products containing 1,2-linkages of the α-olefins. The olefinic carbon atoms form the main chain in the product, while the residue R appears as the side-chain:

Now it has surprisingly been found that it is possible to link α-olefins with high product yields in a way different from that described above and thereby to produce structural units which so far have been not known for α-olefin polymers.

According to the present invention, the moiety —CH$_2$—R of an α-olefin CH$_2$=CH—CH$_2$R successfully has been incorporated in the main chain whereby methyl side-chains are formed at definite distances depending on the employed species of α-olefin. Thus, when linear α-olefins are employed, products are formed which correspond to a 2,ω-linkage.

(R = H and/or Alkyl n = 1-17)

Polymers having such a structure have not been known so far. In the German Offenlegungsschrift (DE-OS) 26 23 718 S. Yasui et al. obtain, by hydrogenation of polyisoprene oils, a mixture which allegedly contains 70% of a 1,4-polymer having the structure Nothing has been mentioned on either the residues nor on any evidence of the above configuration.

In the DE-OS 21 01 069 dal'Asta et al. describe elastomeric hydrocarbons which inter alia are obtained by hydrogenation of poly-2,3-dimethylbutadiene. Here, as in similar cases of the DE-OS, a mixture of cyclic oligomers and linear headtail, head-head and tail-tail oligomers is obtained. The cationic polymerization of 3-methylbutene-1 with AlCl$_3$ results in the formation of polymers having a probable structure represented by the formula

[I. P. Kennedy et al., Makromolekulare Chemie 53 (1962), page 28.] All of the mentioned processes lead to mixtures comprising polymers part of which has not been identified, some of them elastomers, however not to uniform oligomers having the structure shown above.

According to the present invention the distances between the branching points of the methyl groups can be defined as desired by selecting a pertinent α-olefin. Thus, upon use of a linear α-olefin having n CH$_2$ groups there are obtained distances amounting to (n+1) CH$_2$ groups.

The structures of the products obtained in the α-olefin polymerization according to the present invention can be proven of by means of $^{13}$C NMR investigations. The chemical shifts of the carbon atoms were calculated for the respective structures to be expected in accordance with the increment rules established by L. P. Lindemann and J. Q. Adams [Anal. Chem. 43, 1245 (1971)]. Spectra simulated by using these data together with the corresponding intensities were compared to the Spectra No. 1 to 7 as experimentally obtained.

Figure 3:
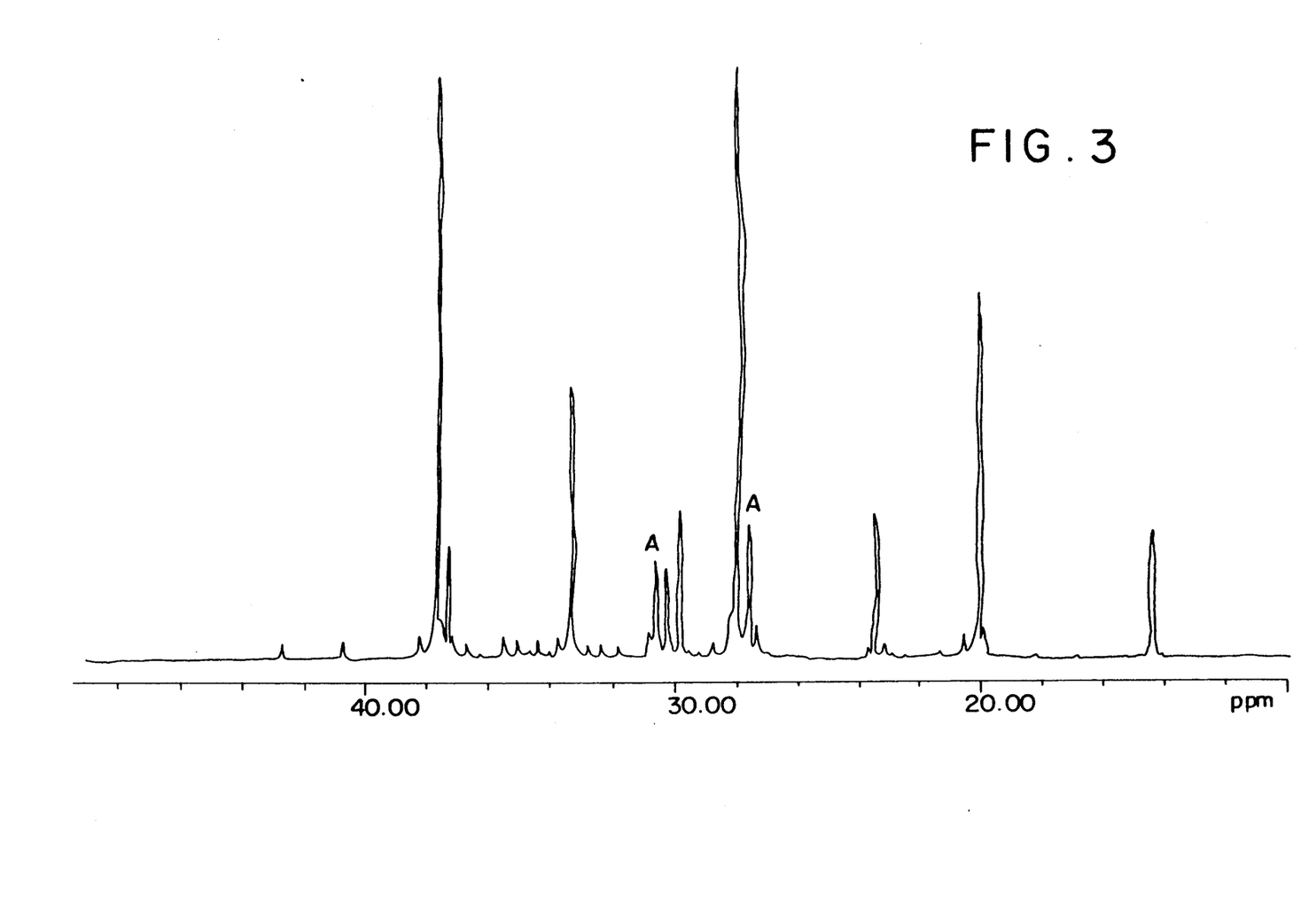
FIG. 3 is the spectrum of Example 1.
Figure 4:
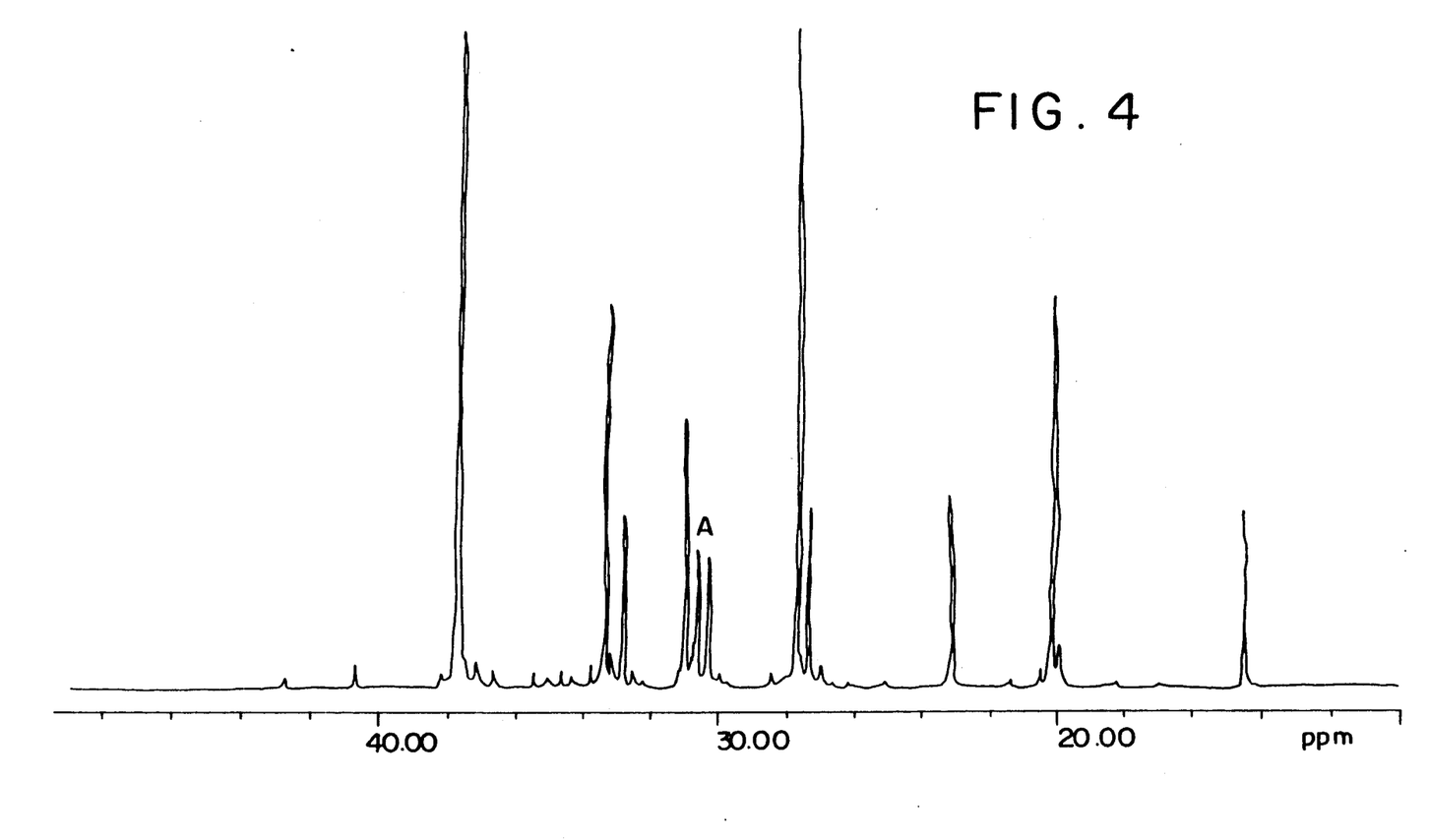
FIGS. 4 to 7 are the spectra of Examples 8 to 11, respectively.
Figure 5:
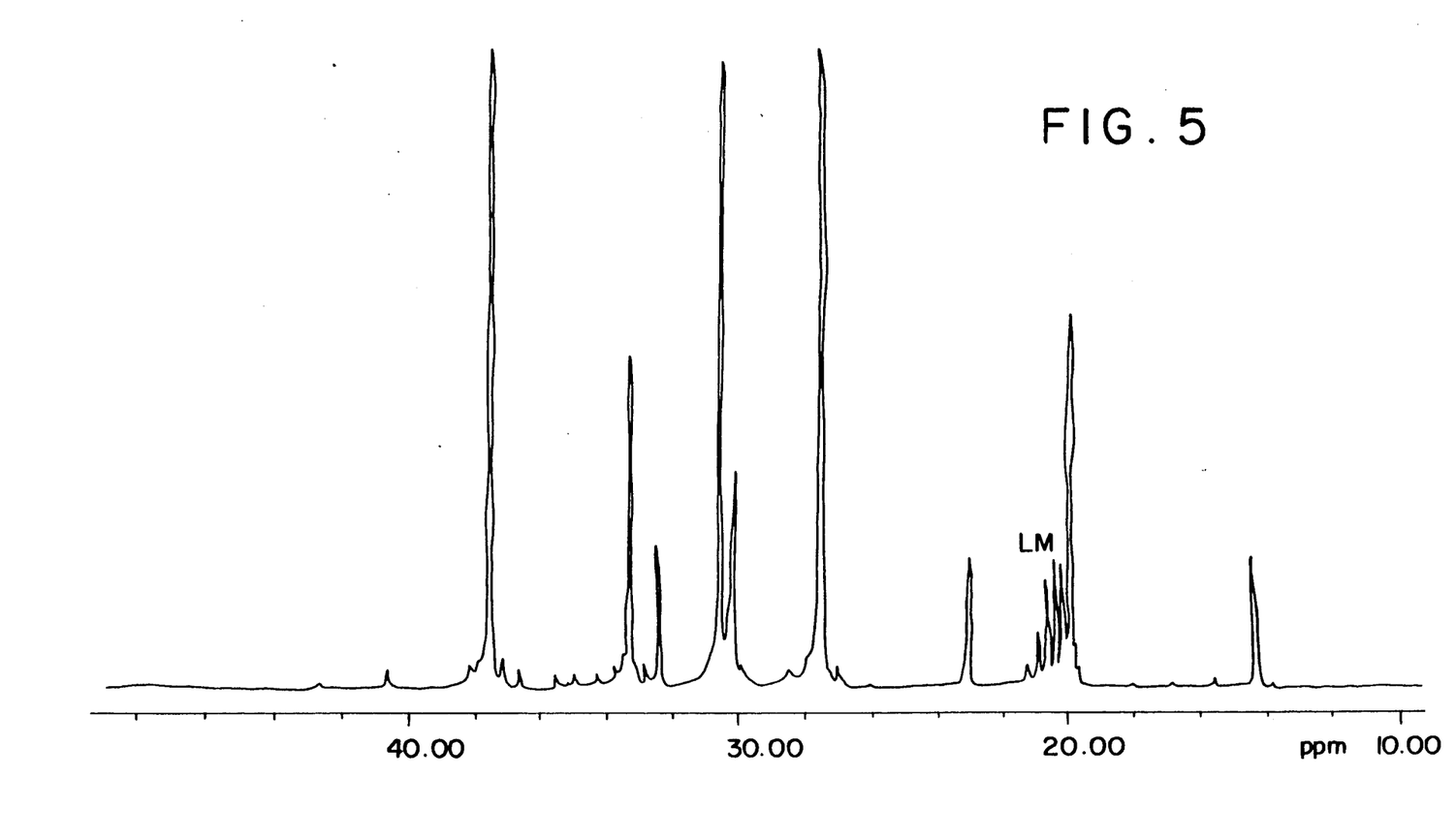
Figure 6:
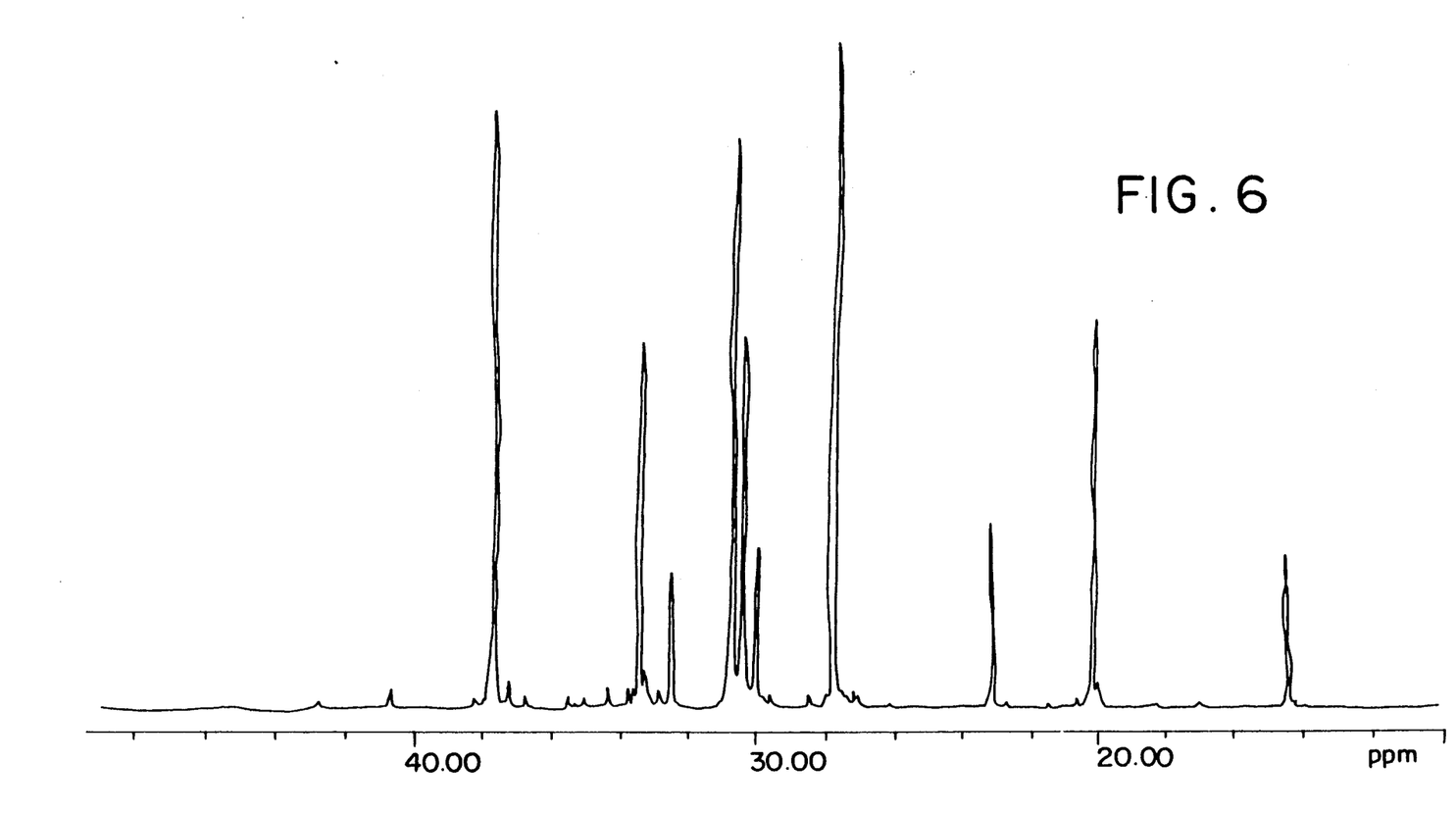
Figure 7:
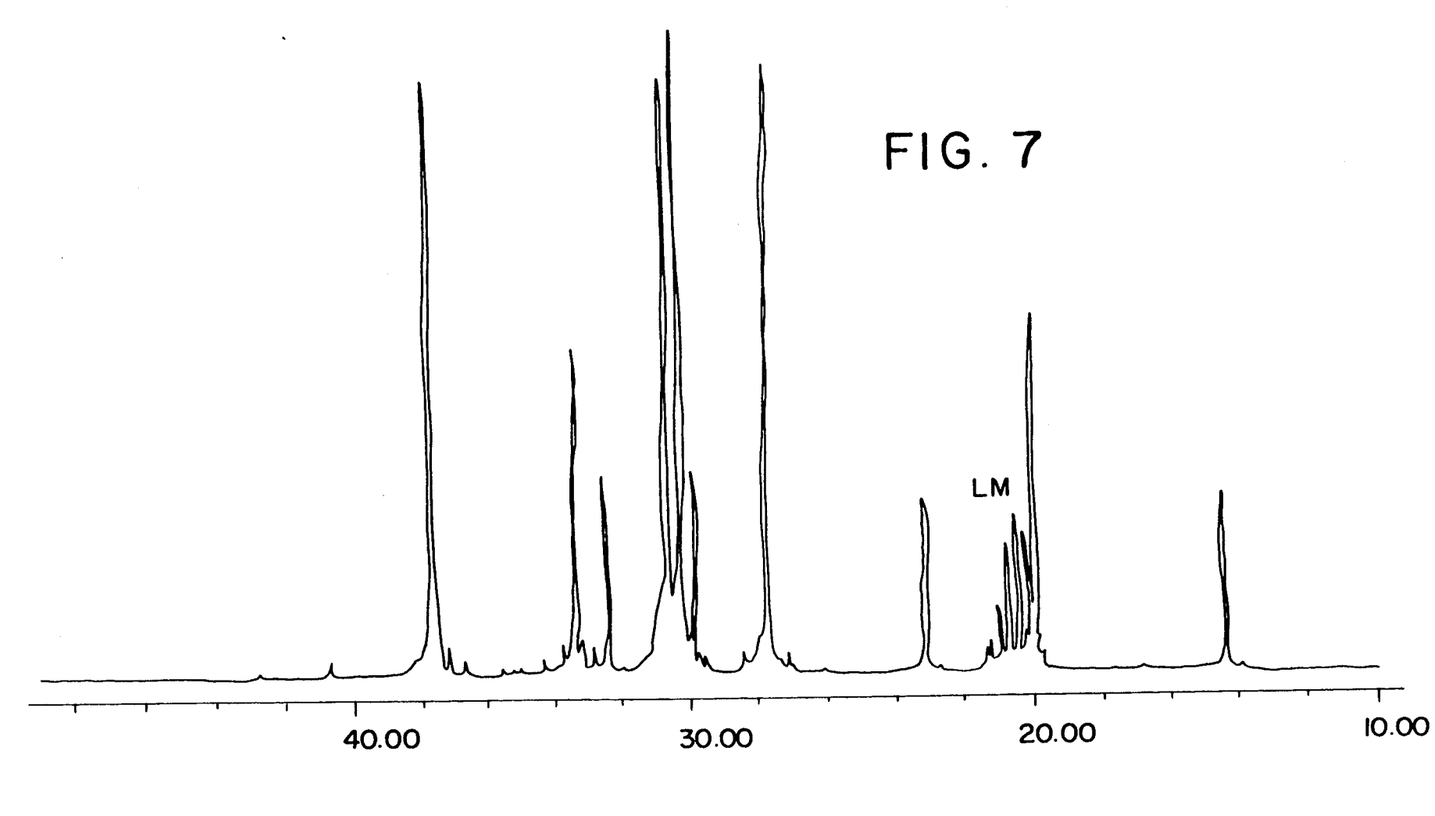

Spectrum No. 1 shows the recorded $^{13}$C NMR spectrum of the butene-1 polymer. All of the signals obtained in simulation using z=2 (z=number of the CH$_2$ groups between the methyl branching points of the polymer) are found in the experimental spectrum. The conformity becomes even more distinctly evident with increasing chain length of the employed α-olefin.

Due to their defined structures which may be subject to controlled variations within a wide range, the products offer themselves as model substances for physical investigations. By introducing functional groups at the sites of the methyl side chains of the product there can be prepared subsequent products bearing regularly distributed functions. As the functional groups are spaced apart at precisely defined variable distances along the main chain, there is a possibility of, e.g., producing novel regular graft polymers. Furthermore, upon a successive use of different α-olefins, block copolymers will become accessible which have different branching distances. The regular structure of the polymers causes a high thermal lubricant stability to be achieved.

The described new α-olefin polymers are obtainable in high yield by using a catalyst system which consists of the following components:

a) a Ni(O) compound $NiL_x$, wherein the ligand(s) L may be hydrocarbon compounds and/or hydrogen and b) an aminobis(imino)phosphorane represented by the formula wherein $R_1$ to $R_4$ may be same or different and represent n- or iso-alkyl groups, aryl groups and/or trialkylsilyl groups.

The Ni(O) compound preferably comprises unsaturated hydrocarbon ligands such as, e.g., ethylene, cyclooctadiene-1,5,cyclooctadecatriene-1,5,9,cyclooctatetraene etc.. They may also be produced by reduction of a suitable higher-valent nickel compound in the reaction solution.

The second catalyst component preferably consists of a trimethylsilyl-substituted phosphorane Since all of the catalyst components are soluble in liquid α-olefins under normal conditions, the use of solvents is not required. If α-olefins. are used which are solid at the reaction temperature of if a higher conversion is accomplished and, thereby, the viscosity is markedly increased, aromatic solvents are preferred to be used.

The homogeneous catalyst system is generated "in situ", the exact nature of the active compound is unknown. The sequence of the addition of the individual components and the nature of the employed Ni(O) compound do not exert any influence onto the specific structures of the polymers. The use of the catalyst system on solid support materials is possible. In all variants an atmosphere of a protective gas is required.

The concentration of the Ni(O) compound in the liquid monomer or monomer/solvent mixture, respectively, is preferably at from $10^{-3}$ to $10^{-1}$ mol/l.

The ratio of the Ni(O) compound to aminobis(imino)phosphorane should preferably be at least equimolar; a ratio of from 1:1 to 1:10 is beneficial. The reaction temperature is from $-78°$ C. to $+80°$ C. and preferably from $-20°$ C. to $+30°$ C.

Linear and branched α-olefins as well as those substituted by (cyclic) alkyl groups are usable in the polymerization. The number of carbon atoms of usable α-olefins has been checked up to a number of 20. This dimension does not restrict the usability of the catalyst system.

Upon use of α-olefin mixtures having any optional composition there are obtained, depending on initial monomers employed, randomly distributed branching points bearing methyl side chains in the copolymerization product. If during the reaction different α-olefins are successively added to the batch, then block copolymers having differing methyl branching point distributions in the individual blocks are obtained. The presence of β-, γ- etc. olefins does not destroy the catalyst system while, however, the activity thereof becomes reduced.

The molar masses and the distribution of molar masses of the products may be varied by selecting the reaction parameters such as, e.g., the reaction temperature and reaction time. At temperatures of below about 0° C., at molecular weights increasing with a decrease in temperature, narrow molecular weight distributions are obtained. Above or about 0° C. with increasing temperature the molecular weights become increasingly smaller, while the molecular weight distributions become broader.

The present invention is further illustrated by the following non-limiting examples in conjunction with the accompanying drawings which are $^{13}C$ NMR spectra corresponding to the examples as follows.

EXAMPLE 1

Figure 1:
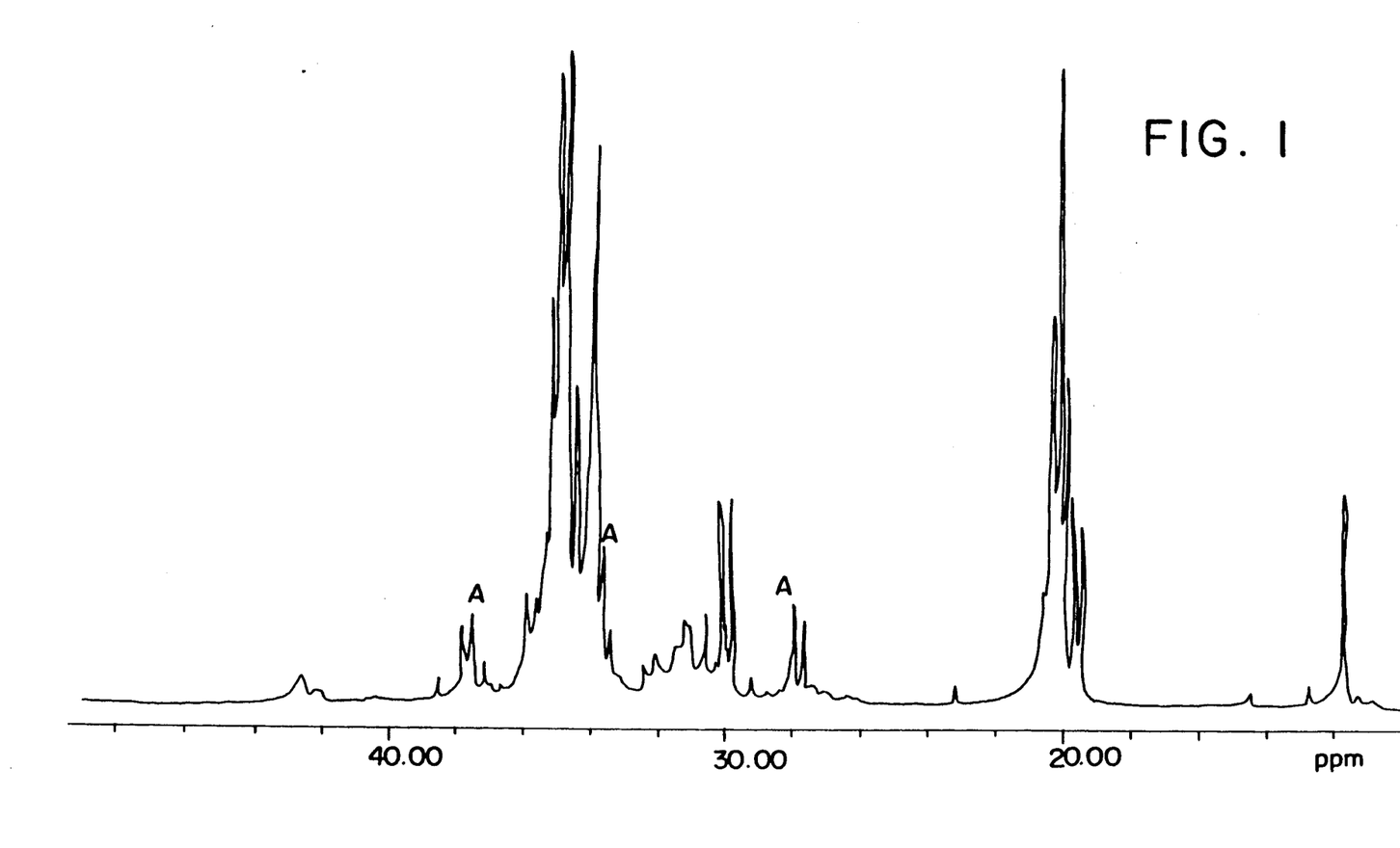
FIG. 1 is the spectrum of Example 3.

In a glass vessel pre-conditioned by heating under vacuum and filled with argon 0.69 g of bis(cyclooctadiene-1,5)nickel and 0.92 g of bis(trimethylsilyl)amino-bis(trimethylsilylimino)phosphorane were dissolved in 40 ml of dry toluene. Upon addition of 20 ml of hexene-1 the solution was stirred at 0° C. for 7 hours. In the working-up for product recovery the catalyst was decomposed with a methanolic HCl solution, and the product was recovered after precipitation with methanol. After drying under vacuum there were obtained 10.5 g (78%) of poly-2,6-(hexene-1) ($M_n = 1$ 700):

$^{13}C$ NMR Spectrum No. 3.

EXAMPLE 2

Figure 2:
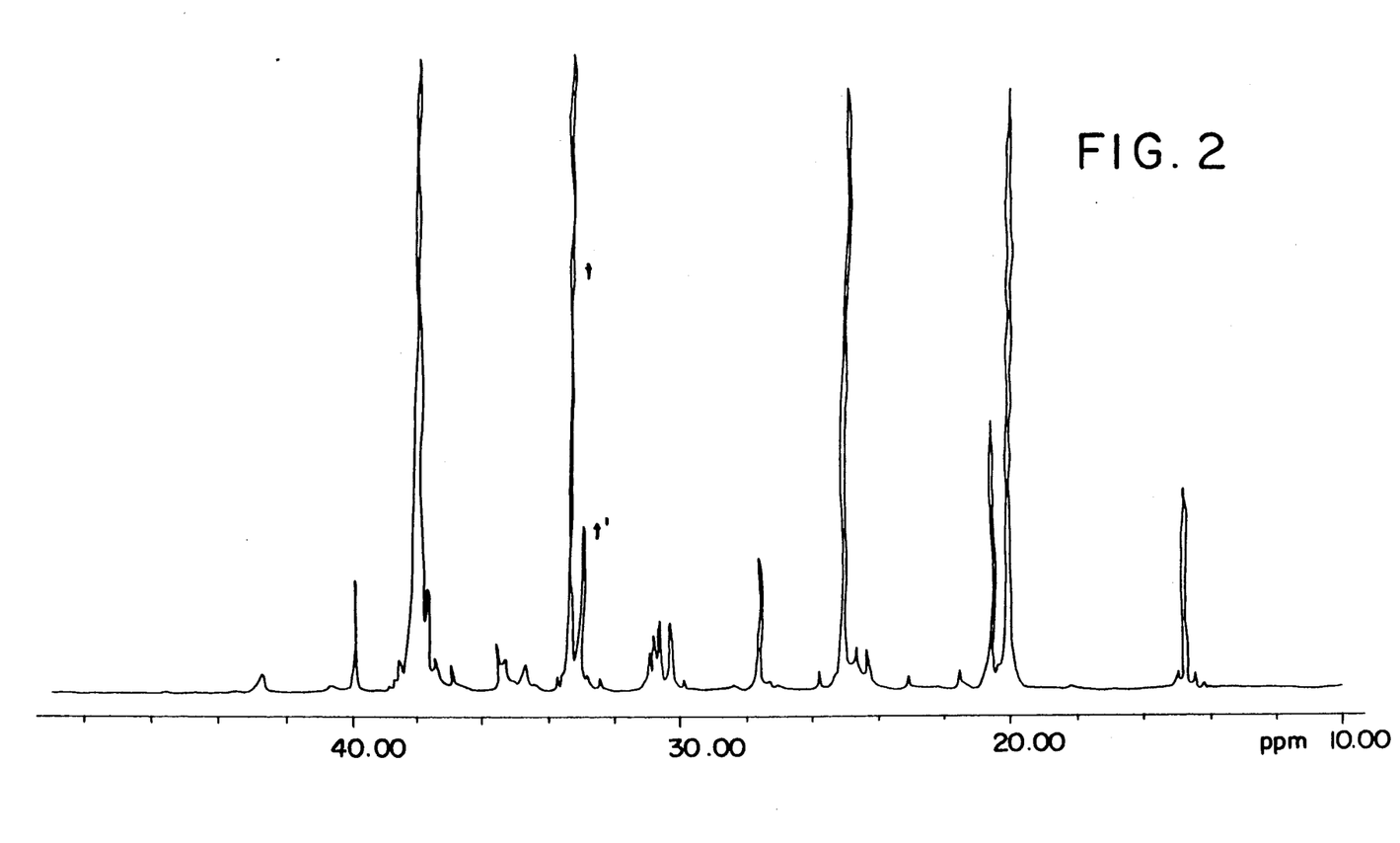
FIG. 2 is the spectrum of Example 2.

In a glass vessel pre-conditioned by heating under vacuum and filled with argon 0.34 g of cyclooctadectriene-1,5,9)nickel and 0.56 g of bis(trimethylsilyl)amino-bis(trimethylsilylimino)phosphorane were dissolved in 18 ml of pentene-1, and the solution was stirred at 0° C. for 24 hours. After a working-up procedure as described in Example 1 there were obtained 8.4 g (73%) of poly-2,5-(pentene-1) ($M_n = 1$ 100):

$^{13}C$ NMR Spectrum No. 2.

(This structure conforms to a strictly alternating ethene/propene copolymer!)

EXAMPLE 3

A 100 ml steel autoclave which had been evacuated and filled with argon was charged with a solution of 0.69 g of bis(cyclooctadiene-1,5)nickel and 0.92 g of bis(trimethylsilyl)amino-bis(trimethylsilylimino)phosphorane in 30 ml of dry toluene. Upon addition of 18 g of liquefied butene-1 the mixture was stirred at room temperature for 3 hours. After a working-up procedure as described in Example 1 there were obtained 11.6 g (66%) of poly-2,4-(butene-1) ($M_n = 900$):

$^{13}$C NMR Spectrum No. 1.

EXAMPLE 4

In a glass vessel pre-conditioned by heating under vacuum and filled with argon 0.17 g (0.62 mmol) of bis(cyclooctadiene-1,5)nickel and 0.92 g (2.5 mmol) of bis(trimethylsilyl)amino-bis(trimethylsilylimino)phosphorane were dissolved in 30 ml of pentene-1, and the solution was stirred at 0° C. for 24 hours. After a working-up procedure as described in Example 1 there were obtained 17.4 g (91%) of poly-2,5-(pentene-1) ($M_n = 1\ 300$). The structure was in accordance with the product of Example 2. $^{13}$C NMR Spectrum No. 2.

EXAMPLE 5

In a glass vessel pre-conditioned by heating under vacuum and filled with argon 0.34 g (1.24 mmol) of bis(cyclooctadiene-1,5)nickel and 0.46 g (1.25 mmol) of bis(trimethylsilyl)amino-bis(trimethylsilylimino)phosphorane were dissolved in 20 ml of decene-1, and the solution was stirred at 0° C. for 3 hours. Then to the gel-like mass there were added 20 ml of hexene-1, and the mixture was stirred at 0° C. for another 4 hours. After a working-up procedure as described in Example 1 there were obtained 24.0 g (85% of the total amount) of a decene-1/hexene-1 block copolymer which had a methyl branching point characteristic corresponding to the molar ratio of the α-olefin reactants ($M_n = 1\ 900$).

EXAMPLE 6

In a glass vessel pre-conditioned by heating under vacuum and filled with argon 0.34 g (1.24 mmol) of bis(cyclooctadiene-1,5)nickel and 0.46 g (1.25 mmol) of bis(trimethylsilyl)amino-bis(trimethylsilylimino)phosphorane were dissolved in 20 ml of dry toluene. Upon addition of 10 ml of 4-methylpentene-1 the solution was stirred at room temperature for 3 hours. After a working-up procedure as described in Example 1 there were obtained 3.7 g (56%) of poly-2,5-(4-methylpentene-1) ($M_n = 800$):

EXAMPLE 7

In a glass vessel pre-conditioned by heating under vacuum and filled with argon 0.34 g of bis(cyclooctadiene-1,5)nickel and 0.46 g of bis(trimethylsilyl)amino-bis(trimethylsilylimino)phosphorane were dissolved in 20 ml of dry toluene, and upon addition of 7.0 g of eicosene-1 the solution was stirred at room temperature for 14 days. After a working-up procedure as described in Example 1 there were obtained 2.4 g (34%) of poly-2,20-(eicosene-1) ($M_n = 1\ 200$).

EXAMPLES 8 to 11

Heptene-1, octene-1, nonene-1 and decene-1 were reacted using the procedures of the Examples as indicated in the following Table which also shows the obtained yields and $M_n$ values.

TABLE

| α-Olefin Polymerization: | | | | |
|---|---|---|---|---|
| α-olefin | according to Example | temperature (°C.) | yield (%) | $M_n$ |
| Heptene-1 | 4 | 0 | 66 | 1 200 |
| Octene-1 | 2 | 0 | 67 | 1 300 |
| Nonene-1 | 4 | 25 | 32 | 1 000 |
| Decene-1 | 1 | 25 | 27 | 1 300 |

The $^{13}$C NMR Spectra Nos. 4 to 7 were measured using respective product samples.

What is claimed is:

1. A polymer or oligomer prepared from an α-olefin monomer having more than 3 carbon atoms, or mixtures thereof, the distances of the methyl branching sites being controlled by the selection of the α-olefins, and consisting of units having the structure wherein R=H and/or alkyl, and n=1-17.

2. A polymer or oligomer according to claim 1, wherein the α-olefin is linear or branched, unsubstituted or substituted with (cyclic alkyl groups, and has 4 to 20 carbon atoms.

3. A polymer or oligomer according to claim 1, wherein n is 1.

4. A polymer or oligomer according to claim 1, wherein n is 3-17.

5. A polymer or oligomer according to claim 1, wherein the α-olefin is linear or branched, unsubstituted or substituted with (cyclic alkyl groups, and has 4 carbon atoms.

6. A polymer or oligomer according to claim 1, wherein the α-olefin is linear or branched, unsubstituted or substituted with (cyclic) alkyl groups, and has 6 carbon atoms.

* * * * *